United States Patent
Cronin et al.

(10) Patent No.: US 9,699,523 B1
(45) Date of Patent: Jul. 4, 2017

(54) AUTOMATED CLIP CREATION

(71) Applicant: ProSports Technologies, LLC, Miami, FL (US)

(72) Inventors: John E. Cronin, Bonita Springs, FL (US); Nick Reasner, Chicago, IL (US)

(73) Assignee: PROSPORTS TECHNOLOGIES, LLC, Miami, FL (US)

(*) Notice: Subject to any disclaimer, the term of this patent is extended or adjusted under 35 U.S.C. 154(b) by 0 days.

(21) Appl. No.: 14/838,767

(22) Filed: Aug. 28, 2015

Related U.S. Application Data (60) Provisional application No. 62/047,174, filed on Sep. 8, 2014, provisional application No. 62/047,177, filed on Sep. 8, 2014.

(51) Int. Cl.
*H04N 7/10* (2006.01)
*H04N 7/025* (2006.01)
*H04N 21/8549* (2011.01)
*H04N 21/81* (2011.01)
*H04N 21/24* (2011.01)
*H04N 21/845* (2011.01)
*H04N 21/643* (2011.01)

(52) U.S. Cl.
CPC ......... *H04N 21/8549* (2013.01); *H04N 21/24* (2013.01); *H04N 21/64322* (2013.01); *H04N 21/812* (2013.01); *H04N 21/8133* (2013.01); *H04N 21/8455* (2013.01)

(58) Field of Classification Search
CPC ............. H04N 21/8549; H04N 21/812; H04N 21/8133; H04N 21/24; H04N 21/8455; H04N 21/64322

USPC .......................................... 725/9–21, 32–36
See application file for complete search history.

(56) References Cited

U.S. PATENT DOCUMENTS

| | | | |
|---|---|---|---|
| 6,080,063 | A | 6/2000 | Khosla |
| 6,144,375 | A | 11/2000 | Jain et al. |
| 6,204,813 | B1 | 3/2001 | Wadell et al. |
| 6,952,558 | B2 | 10/2005 | Hardacker |
| 7,079,176 | B1 | 7/2006 | Freeman et al. |
| 7,091,863 | B2 | 8/2006 | Ravet |
| 7,136,042 | B2 | 11/2006 | Magendanz et al. |

(Continued)

FOREIGN PATENT DOCUMENTS

| | | |
|---|---|---|
| CN | 102843186 | 12/2012 |
| EP | 2 150 057 | 12/2013 |

(Continued)

OTHER PUBLICATIONS

U.S. Appl. No. 14/798,314, filed Jul. 13, 2015, John E. Cronin, Ball Tracker Camera.

(Continued)

*Primary Examiner* — Yassin Alata
(74) *Attorney, Agent, or Firm* — Polsinelli LLP (57) ABSTRACT

The present invention includes systems and methods for providing video clips. One or more users may set one or more parameters for automatically creating one or more video clips of an event. One or more sources may provide event information used to trigger video clip creation. An advertisement may be inserted into one or more created video clips. Each video clip may be associated with metadata and downloaded by a user device user, wherein metadata may identify one or more parameters associated with the video clip.

17 Claims, 6 Drawing Sheets

(56) References Cited

U.S. PATENT DOCUMENTS

| | | |
|---|---|---|
| 7,383,229 B2 | 6/2008 | Jacoby |
| 7,583,901 B2 | 9/2009 | Nakagawa et al. |
| 7,620,426 B2 | 11/2009 | Ortiz et al. |
| 7,715,723 B2 | 5/2010 | Kagawa et al. |
| 7,721,339 B2 | 5/2010 | Madison et al. |
| 7,734,730 B2 | 6/2010 | McCanne |
| 7,743,070 B1 | 6/2010 | Blumberg |
| 7,849,160 B2 | 12/2010 | Hayward |
| 7,884,855 B2 | 2/2011 | Ortiz |
| 8,019,227 B2 | 9/2011 | Iizuka |
| 8,042,140 B2 | 10/2011 | Thomas et al. |
| 8,091,111 B2 | 1/2012 | Logan et al. |
| 8,237,787 B2 | 8/2012 | Hollinger |
| 8,279,051 B2 | 10/2012 | Khan |
| 8,333,321 B2 | 12/2012 | Gressel et al. |
| 8,391,773 B2 | 3/2013 | Arseneau et al. |
| 8,408,553 B2 | 4/2013 | Eskildsen |
| 8,482,612 B2 | 7/2013 | Tamir et al. |
| 8,526,931 B1 | 9/2013 | Fraley |
| 8,538,276 B2 | 9/2013 | Shimada et al. |
| 8,588,432 B1 | 11/2013 | Simon |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,622,832 B2 | 1/2014 | Marty et al. |
| 8,626,465 B2 | 1/2014 | Moore et al. |
| 8,630,216 B2 | 1/2014 | Deivasigamani et al. |
| 8,638,367 B1 | 1/2014 | Allen |
| 8,660,501 B2 | 2/2014 | Sanguinetti |
| 8,706,044 B2 | 4/2014 | Chang et al. |
| 8,724,723 B2 | 5/2014 | Panicker et al. |
| 8,736,681 B2 | 5/2014 | Matsuzawa |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,124,729 B2 | 9/2015 | Jung et al. |
| 9,498,678 B2 | 11/2016 | Cronin |
| 9,571,903 B2 | 2/2017 | Cronin |
| 9,591,336 B2 | 3/2017 | Cronin |
| 9,655,027 B1 | 5/2017 | Cronin |
| 2002/0132612 A1 | 9/2002 | Ishii |
| 2002/0156835 A1 | 10/2002 | Williams et al. |
| 2003/0023595 A1 | 1/2003 | Carlbom et al. |
| 2004/0071209 A1 | 4/2004 | Burg et al. |
| 2004/0086257 A1 | 5/2004 | Werberig et al. |
| 2004/0171381 A1 | 9/2004 | Inselberg |
| 2005/0012023 A1 | 1/2005 | Vock et al. |
| 2005/0027608 A1* | 2/2005 | Wiesmuller ............ G06Q 20/04 705/80 |
| 2005/0093976 A1 | 5/2005 | Valleriano et al. |
| 2005/0202905 A1 | 9/2005 | Chesser |
| 2005/0259618 A1 | 11/2005 | Ahya et al. |
| 2005/0273830 A1 | 12/2005 | Silver et al. |
| 2006/0067654 A1 | 3/2006 | Herberger et al. |
| 2007/0188611 A1 | 8/2007 | Carter |
| 2007/0188612 A1 | 8/2007 | Carter |
| 2007/0200929 A1 | 8/2007 | Conaway |
| 2008/0137507 A1 | 6/2008 | Sun et al. |
| 2008/0140233 A1 | 6/2008 | Seacat |
| 2008/0192116 A1 | 8/2008 | Tamir et al. |
| 2008/0214211 A1 | 9/2008 | Lipovski |
| 2009/0061971 A1 | 3/2009 | Weitzner et al. |
| 2009/0082110 A1 | 3/2009 | Relyea et al. |
| 2009/0171571 A1 | 7/2009 | Son et al. |
| 2010/0026809 A1 | 2/2010 | Curry |
| 2010/0043040 A1 | 2/2010 | Olsen |
| 2010/0123830 A1* | 5/2010 | Vunic ............... G06K 9/00711 348/700 |
| 2010/0245588 A1 | 9/2010 | Waehner et al. |
| 2010/0306064 A1 | 12/2010 | Inselburg |
| 2011/0014974 A1 | 1/2011 | Torf |
| 2011/0050904 A1 | 3/2011 | Anderson |
| 2011/0125809 A1 | 5/2011 | Woods et al. |
| 2011/0165946 A1 | 7/2011 | Pavlich et al. |
| 2011/0202945 A1 | 8/2011 | Pickelsimer et al. |
| 2011/0280540 A1 | 11/2011 | Woodman |
| 2011/0304737 A1 | 12/2011 | Evans et al. |
| 2012/0052949 A1 | 3/2012 | Weitzner et al. |
| 2012/0054178 A1 | 3/2012 | Tran et al. |
| 2012/0188345 A1 | 7/2012 | Salow |
| 2012/0229338 A2 | 9/2012 | Eidloth et al. |
| 2012/0296826 A1 | 11/2012 | Bergdale et al. |
| 2012/0317302 A1 | 12/2012 | Silvestri et al. |
| 2013/0126713 A1 | 5/2013 | Haas et al. |
| 2013/0141555 A1 | 6/2013 | Ganick et al. |
| 2013/0160051 A1 | 6/2013 | Armsrong et al. |
| 2013/0182117 A1 | 7/2013 | Arseneau et al. |
| 2013/0196788 A1 | 8/2013 | Shimizu et al. |
| 2013/0205341 A1 | 8/2013 | Jabara et al. |
| 2013/0208184 A1 | 8/2013 | Castor et al. |
| 2013/0268620 A1 | 10/2013 | Osminer |
| 2013/0279917 A1 | 10/2013 | Son et al. |
| 2013/0283305 A1 | 10/2013 | Hirsch et al. |
| 2013/0286212 A1 | 10/2013 | Sandler et al. |
| 2013/0300821 A1 | 11/2013 | Lankford et al. |
| 2013/0300832 A1 | 11/2013 | Hohteri et al. |
| 2013/0303192 A1 | 11/2013 | Louboutin et al. |
| 2013/0305297 A1 | 11/2013 | Jabara et al. |
| 2013/0317835 A1 | 11/2013 | Mathew |
| 2013/0328917 A1 | 12/2013 | Zambetti et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335520 A1 | 12/2013 | Campbell et al. |
| 2013/0336662 A1 | 12/2013 | Murayama et al. |
| 2013/0343762 A1 | 12/2013 | Murayama et al. |
| 2014/0031058 A1 | 1/2014 | Zhang et al. |
| 2014/0057658 A1 | 2/2014 | Murad et al. |
| 2014/0062773 A1 | 3/2014 | MacGougan |
| 2014/0063259 A1 | 3/2014 | Rhodes et al. |
| 2014/0065962 A1 | 3/2014 | Le |
| 2014/0071221 A1 | 3/2014 | Dave |
| 2014/0072270 A1 | 3/2014 | Goldberg et al. |
| 2014/0105084 A1 | 4/2014 | Chhabra |
| 2014/0111625 A1 | 4/2014 | Dawe et al. |
| 2014/0139380 A1 | 5/2014 | Ouyang |
| 2014/0141803 A1 | 5/2014 | Marti |
| 2014/0150042 A1 | 5/2014 | Pacor et al. |
| 2014/0161416 A1 | 6/2014 | Chou et al. |
| 2014/0162628 A1 | 6/2014 | Bevelacqua |
| 2014/0164520 A1 | 6/2014 | Fan |
| 2014/0164760 A1 | 6/2014 | Hybertson |
| 2014/0167794 A1 | 6/2014 | Nath |
| 2014/0168170 A1 | 6/2014 | Lazarescu |
| 2014/0171039 A1 | 6/2014 | Bjontegard |
| 2014/0171114 A1 | 6/2014 | Marti |
| 2014/0180820 A1 | 6/2014 | Louboutin |
| 2014/0191979 A1 | 7/2014 | Tsudik |
| 2014/0195675 A1 | 7/2014 | Silver et al. |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0349750 A1* | 11/2014 | Thompson ............ A63F 13/12 463/31 |

(56) References Cited

U.S. PATENT DOCUMENTS

| | | |
|---|---|---|
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0006648 A1 | 1/2015 | Cao |
| 2015/0007049 A1 | 1/2015 | Langlois |
| 2015/0011242 A1 | 1/2015 | Nagaraj |
| 2015/0026623 A1 | 1/2015 | Horne |
| 2015/0031397 A1 | 1/2015 | Jouaux |
| 2015/0058781 A1 | 2/2015 | Malik et al. |
| 2015/0131845 A1 | 5/2015 | Forouhar et al. |
| 2015/0189349 A1 | 7/2015 | Nelson |
| 2015/0326902 A1 | 11/2015 | Levakov et al. |
| 2016/0008662 A1 | 1/2016 | Cronin |
| 2016/0014435 A1 | 1/2016 | Cronin |
| 2016/0014481 A1 | 1/2016 | Cronin |
| 2016/0062722 A1 | 3/2016 | Cronin |
| 2016/0066159 A1 | 3/2016 | Cronin |

FOREIGN PATENT DOCUMENTS

| | | |
|---|---|---|
| WO | WO 01/41884 | 6/2001 |
| WO | WO 2004/071598 | 8/2004 |
| WO | WO 2007/035878 A2 | 3/2007 |
| WO | WO 2007/035878 A3 | 3/2007 |
| WO | WO 2009/104921 | 8/2009 |
| WO | WO 2011/137100 | 11/2011 |
| WO | WO 2013/121215 | 8/2013 |
| WO | PCT/US15/40207 | 7/2015 |
| WO | PCT/US15/40215 | 7/2015 |
| WO | PCT/US15/40223 | 7/2015 |
| WO | PCT/US15/47148 | 8/2015 |
| WO | PCT/US15/47265 | 8/2015 |
| WO | WO 2016/007962 | 1/2016 |
| WO | WO 2016/007965 | 1/2016 |
| WO | WO 2016/007967 | 1/2016 |
| WO | WO 2016/033366 | 3/2016 |
| WO | WO 2016/036571 | 3/2016 |

OTHER PUBLICATIONS

U.S. Appl. No. 14/798,271, filed Jul. 13, 2015, John Cronin, Event-Based Content Collection for Network-Based Distribution.

U.S. Appl. No. 14/798,286, filed Jul. 13, 2015, John Cronin, Camera Feed Distribution From Event Venue Virtual Seat Cameras.

U.S. Appl. No. 14/788,748, filed Jun. 30, 2015, John Cronin, Sports Television Applications.

U.S. Appl. No. 14/798,346, filed Jul. 13, 2015, John Cronin, Ball Tracker Snippets.

U.S. Appl. No. 14/798,294, filed Jul. 13, 2015, John Cronin, Event Data Transmission to Eventgoer Devices.

U.S. Appl. No. 14/798,296, filed Jul. 13, 2015, John E. Cronin, Event and Fantasy League Data Transmission to Eventgoer Devices.

U.S. Appl. No. 14/837,457, filed Aug. 27, 2015, John E. Cronin, Multiple Display Controller System.

U.S. Appl. No. 14/829,184, filed Aug. 18, 2015, Maxx T. Garrison, Event Media.

U.S. Appl. No. 14/838,129, filed Aug. 27, 2015, John E. Cronin, Current Event and Outside Event Data Transmission to Eventgoer Devices.

"Anvato Announces New Cloud Solution for HD Live Streaming, Clip Editing, Social Sharing and Archival", Anvato Knows/Video, May 12, 2014.

"Aspera to Showcase Digital Media Workflow and Broadcast IT Solutions at Broadcastasia 2013", Aspera News, Jun. 4, 2013.

Barney et al., Casey; "Visible Light Communication Systems", A Major Qualifying Project Report Submitted to the Faculty of the Worchester Polytechnic Institute, Mar. 28, 2014.

"Bright Leverages Cloud to Stream Sports Content Worldwide", by Sports Video Group, Jul. 9, 2013.

"Casio Unveils Prototype of Visible Light Communication System Using Smartphones at CES", Casio Computer Co., Ltd., Jan. 10, 2012.

"Camera Corps Robotic Cameras Systems to Televise Wimbledon Action", TVTechnology, Jun. 24, 2013. http://www.tvtechnology.com/equipment/0082/camera-corps-ro . . . .

"Cisco Stadium Vision Mobile", Cisco, May 21, 2014.

Coxworth, Ben; "NFL may track footballs using magnetic fields", Gizmag.com, Jun. 13, 2014 http://www.gizmag.com/football-tracking-magnetic-fields/3254 . . . .

"Create Innovative Services with Play Apps", Date of Download: Jan. 16, 2014, http://www.oledcomm.com/LIFI.html, Oledcomm—France LiFi.

Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.

Davies, Chris; "Philips LED lights flicker out a challenge to iBeacon and Gimbal", SlashGear, Feb. 17, 2014.

Dawson, Keith; "LiFi in the Real World" All LED Lighting—Illuminating the LED Community, Jul. 31, 2013.

Dinh et al., Thang; "Real time tracking using an active pan-tilt-zoom network camera", Proceeding IROS '09 Proceedings of the 2009 IEEE/RSJ International conference on Intelligent robots and systems. pp. 3786-3793, 2009.

"Engaged Sports Media Selects thePlatform as Centralized Cloud-based Video Publishing System", thePlatform, Oct. 31, 2013.

"EZ Display and EZ Remote for Android—User Guide", InFocus, Jul. 10, 2013.

Fisher et al., Brian E.; "Measurements corner: Three-dimensional position and orientation measurements using magneto-quasistatic fields and complex image theory", IEEE Xplore Abstract, Antennas and Propagation Magazines, IEEE (vol. 56, Iss. 1) Feb. 2014, pp. 160-173.

"Football camera provides ball's-eye view of the field", R&D Magazine Webcast, Feb. 27, 2013.

Gaddam et al., Vamsidhar R.; "Interactive Zoom and Panning from Live Panoramic Video", Nossdav '14 Proceedings of Network and Operating Systems Support for Digital Audio and Video Workshop, Mar. 19, 2014.

Gerhardt, Ryan; "Stadium App Lets Fans Order Food and Get On-Court Close Ups", PSFK.com, Feb. 22, 2013.

"GigaBroadcasting", Li-Fi Consortium, Date of Download: Aug. 14, 2014.

Gilpin, Lyndsey; "How GE created smart lights by integrating beacons into LEDs", TechRepublic, Jun. 6, 2014.

Gorman, Michael; "Outstanding Technology brings visible light communication to phones and tablets via dongle and LEDs", Edgadget International Editions, Jul. 16, 2012.

Haas, Harald; "Delivering safe and secure wireless communications", pureLiFi. Date of download: Jan. 16, 2014 http://purelifi.co.uk/.

Hammond, Teena; "Stadiums race to digitize: How sports teams are scrambling to keep Millenials coming to games", TechRepublic. Apr. 12, 2014.

"Hybrid's Sport Track Enables Robotic Cameras to Follow Action", TVTechnology, May 29, 2013 http://www.tvtechnology.com/news/0086/hybrids-sport-track-en . . . .

Jaffe, Jay; "MLB unveils revolutionary next-level tracking technology on defense", The Strike Zone, Mar. 3, 2014.

Kamenetzky, Andy; "Inside the Most Connected Sports Venue in America (And, No, It Ain't Cowboys Stadium)", Digital Trends, Nov. 6, 2013.

Kaplan, Daniel; "In-game locker room video still rare around NFL", SportsBusiness Journal, Sep. 30, 2013.

Kappeler et al., Uwe-Philipp; "3D Object Localizationi via Stereo Vision using an Omnidirectional and a Perspective Camera", Proceedings of the 2nd. Workshop on Omnidirectional Robot Vision. May 7, 2010. ISBN 978-88-95872-02-5 pp. 7-12.

(56) References Cited

OTHER PUBLICATIONS

Keith Price Bibliography Sports, Line Judge, Ball Position, Ball Tracking and Enhanced Displays, VisionBib. Date of download: Apr. 24, 2014 http://www.visionbib.com/bibliography/motion-f746ba1.html.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Lavars, Nick; "Adidas miCoach Smart Ball tracks your striking power and finesse", Gizmag.com, May 28, 2014 http://www.gizmag.com/adidas-micoach-smart-soccer-ball/3228 . . . .
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
"Manchester City's Etihad Stadium is soon to be transformed into the Premier League's most technologically fan-friendly stadium", Machester City, May 8, 2013.
Montero, Eric, "Design and Implementation of Color-Shift Keying for Visible Light Communications", Sep. 2013, McMaster University.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consortium (VLCC), Apr. 26, 2012.
Pawate et al., Raj; "Remote display technology enhances the cloud's user experience", Texas Instruments, Aug. 2012.
Pingali et al., Gopal' "Lucentivision: Converting Real World Events Into Multimedia Experiences", Multimedia and Expo, 2000. ICME 2000. 2000 IEEE International Conference on vol. 3, Jul. 30, 2000-Aug. 2, 2000.
Povey, Gordon, "VLC for Location, positioning and navigation", Jul. 27, 2011, http://visiblelightcomm.com/vlc-for-location-positioning-and-n . . . .
"Proprietary Data is Foundational", Contextual Database| Delivery Agent, Inc. Date of Download: Apr. 30, 2014 http://www.deliveryagent.com/products/contextual-database/.
RedFIR Precision Real-Time Tracking, Fraunhofer Institute for Integrated Circuits IIS. Oct. 7, 2015.
Ren et al., Jinchang; "A General Framework for 3D Soccer Ball Estimation and Tracking", Image Processing, 2004. ICIP '04. 2004 International Conference on (vol. 3) Date of Conference: Oct. 24-27, 2004.
Rufo et al., J.; "Visible Light Communication Systems for Optical Video Transmission", Microwave and Optical Technology Letters, vol. 52, No. 7, Jul. 2010.
"Streaming Video Online Databases", MLibrary, University of Michigan. Maintained by: Clara Slavens, last modified: Apr. 17, 2014.
"Surveillance Monitoring—Networking Security—PTZ Network Cameras", Panasonic USA. http://www.panasonic.com/business/psna/products-surveillance-monitoring/network-security-cameras/ptz-cameras.aspx Date of Download: Apr. 29, 2014.
Swedberg, Claire; "RFID Helps Soccer Teams Keep Their Eye on the Ball, and Their Players", RFID Journal, Mar. 13, 2012.
Thanigavel, M.; "Li-Fi Technology in Wireless Communication", International Journal of Engineering Research & Technology (IJERT), ISSN: 2278-0181, vol. 2 Issue 10, Oct. 2013.
Wells, Alton; "How would you build a gimball system that could track any point within a 360 degree "sphere"", AskEngineers. Posted on Aug. 26, 2013.
Wiedeman, Reeves; "Sporting Kansas City Makes the Stadium More Like Your Couch", BloombergBusinessweek, Jul. 18, 2013.
Woodward, Alexander; Delmas, Patrice; "Computer Vision for Low Cost 3-D Golf Ball and Club Tracking", CITR, University of Auckland, Dept. Computer Science, New Zealand.Date of Download: Apr. 29, 2014.
Won, Eun Tae; "Visible Light Communication: Tutorial", Project: IEEE P802.15 Working Group for Wireless Personal Area Networks (WPANs), Mar. 9, 2008.
"World Cup 2014: Goalline technology TV process reviewed", BBC Sport, Jun. 16, 2014. http://www.bbc.com/sport/0/football/27864393.
Yan, Fei; "Tennis Ball Tracking for Automatic Annotation of Broadcast Tennis Video", Centre for Vision, Speech and Signal Processing, School of Electronics and Physical Sciences, Jun. 2007.
Yu, Shuang; "Automatic Basketball Tracking in Broadcast Basketball Video", A Thesis submitted in partial fulfillment of the requirements for the Degree of Master of Science in The Faculty of Graduate Studies. Aug. 2012.
PCT Application No. PCT/US2015/033613 International Search Report and Written Opinion mailed Sep. 1, 2015.
PCT Application No. PCT/US2015/040207 International Search Report and Written Opinion mailed Oct. 5, 2015.
PCT Application No. PCT/US2015/040215 International Search Report and Written Opinion mailed Sep. 29, 2015.
PCT Application No. PCT/US2015/040223 International Search Report and Written Opinion mailed Oct. 1, 2015.
U.S. Appl. No. 14/798,271 Office Action mailed Nov. 2, 2015.
U.S. Appl. No. 14/788,748 Office Action mailed Nov. 5, 2015.
U.S. Appl. No. 14/798,294 Office Action mailed Nov. 2, 2015.
U.S. Appl. No. 14/838,129 Office Action mailed Oct. 29, 2015.
PCT Application No. PCT/US2015/047265 International Search Report and Written Opinion mailed Dec. 7, 2015.
U.S. Appl. No. 14/798,286 Office Action mailed Dec. 4, 2015.
U.S. Appl. No. 14/829,184 Office Action mailed Nov. 23, 2015.
PCT Application No. PCT/US2015/047148 International Search Report and Written Opinion mailed Dec. 17, 2015.
U.S. Appl. No. 14/798,271 Final Office Action mailed May 5, 2016.
U.S. Appl. No. 14/798,296 Office Action mailed Apr. 5, 2016.
U.S. Appl. No. 14/837,457 Office Action mailed Feb. 16, 2016.
U.S. Appl. No. 14/829,184 Final Office Action mailed Mar. 21, 2016.
U.S. Appl. No. 14/798,346 Office Action mailed Dec. 18, 2015.
U.S. Appl. No. 14/798,286 Final Office Action mailed Jun. 8, 2016.
U.S. Appl. No. 14/788,748 Final Office Action mailed May 26, 2016.
U.S. Appl. No. 14/798,346 Final Office Action mailed Jun. 30, 2016.
U.S. Appl. No. 14/798,294 Final Office Action mailed May 13, 2016.
U.S. Appl. No. 14/838,129 Final Office Action mailed Jun. 10, 2016.
U.S. Appl. No. 14/798,294 Office Action mailed Oct. 4, 2016.
David M. Howard et al., "Acoustics and Psychoacoustics", Fourth Edition, Elsevier, Focal Press, 2009 in 50 pages.
U.S. Appl. No. 14/798,296 Final Office Action mailed Sep. 13, 2016.
U.S. Appl. No. 14/837,457 Final Office Action mailed Aug. 23, 2016.
U.S. Appl. No. 14/829,184 Office Action mailed Sep. 12, 2016.
U.S. Appl. No. 14/788,748 Office Action mailed Mar. 23, 2017.
U.S. Appl. No. 14/837,457 Office Action mailed Mar. 20, 2017.
U.S. Appl. No. 14/829,184 Final Office Action mailed Mar. 1, 2017.
U.S. Appl. No. 14/798,271 Office Action mailed Jan. 26, 2017.

* cited by examiner

AUTOMATED CLIP CREATION

CROSS-REFERENCE TO RELATED APPLICATIONS

This application claims the priority benefit of U.S. provisional application No. 62/047,174, filed on Sep. 8, 2014 and titled "Video Snippets Downloaded Over TV" and U.S. provisional application No. 62/047,177, filed on Sep. 8, 2014 and titled "Video Snippets Downloaded At The Game," the disclosures of which are incorporated herein by reference.

BACKGROUND OF THE INVENTION

Field of the Invention

The present invention relates generally to generating event video clips. More specifically, the present invention relates to automating clip creating and delivery using predetermined triggers.

Description of the Related Art

Marketers currently have a variety of options for engaging viewers. Marketers may create social media accounts associated with an event. Marketers may set up interviews for participants of the event. Marketers may also sell merchandise related to the event.

It is difficult, however, to quickly generate and provide video material of an event based on viewer response. Viewer interest may be difficult to predict. An irregular occurrence, for example, may generate viewer interest. Viewer response may also be difficult to measure regarding controversial events. Identifying material of interest to a viewer may require a lengthy turnaround time.

There is a need in the art for improved systems and methods for providing event clips.

SUMMARY OF THE PRESENTLY CLAIMED INVENTION

One exemplary method for providing event clips describes receiving event input captured by one or more sensors and one or more event parameters. At least one of the one or more event parameters is provided by an advertiser. The method also describes creating a video clip of the event when at least one of the one or more parameters is satisfied. The method also describes transmitting the video clip to a portal. the video clip is accessible through the portal after a payment is received for the video clip.

One exemplary system for providing event clips provides one or more sensors and a processor. Execution of instructions stored in the memory by the processor performs a set of operations. The operations include receiving event input captured by the one or more sensors and one or more event parameters. At least one of the one or more event parameters is provided by an advertiser. The operations also include creating a video clip of the event when at least one of the one or more parameters is satisfied. The operations also include transmitting the video clip to a portal. The video clip is accessible through the portal after a payment is received for the video clip.

One exemplary non-transitory computer-readable storage medium is also described, the non-transitory computer-readable storage medium having embodied thereon a program executable by a processor for providing event clips. The exemplary program method describes receiving event input and one or more event parameters. At least one of the one or more event parameters is provided by an advertiser. The program method also describes creating a video clip of the event when at least one of the one or more parameters is satisfied. The program method also describes transmitting the video clip to a portal. The video clip is accessible through the portal after a payment is received for the video clip.

DETAILED DESCRIPTION

The present invention includes systems and methods for providing video clips. One or more users may set one or more parameters for automatically creating one or more video clips of an event. One or more sources may provide event information used to trigger video clip creation. An advertisement may be inserted into one or more created video clips. Each video clip may be associated with metadata and downloaded by a user device user, wherein metadata may identify one or more parameters associated with the video clip.

Event clips may be provided for entertainment or cultural events that are presented at a theatre, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, the opera, and the like; religious events; and more permanent exhibitions such as museum, historic home, and the like. Names used for people and organizations are also exemplary.

Figure 1:
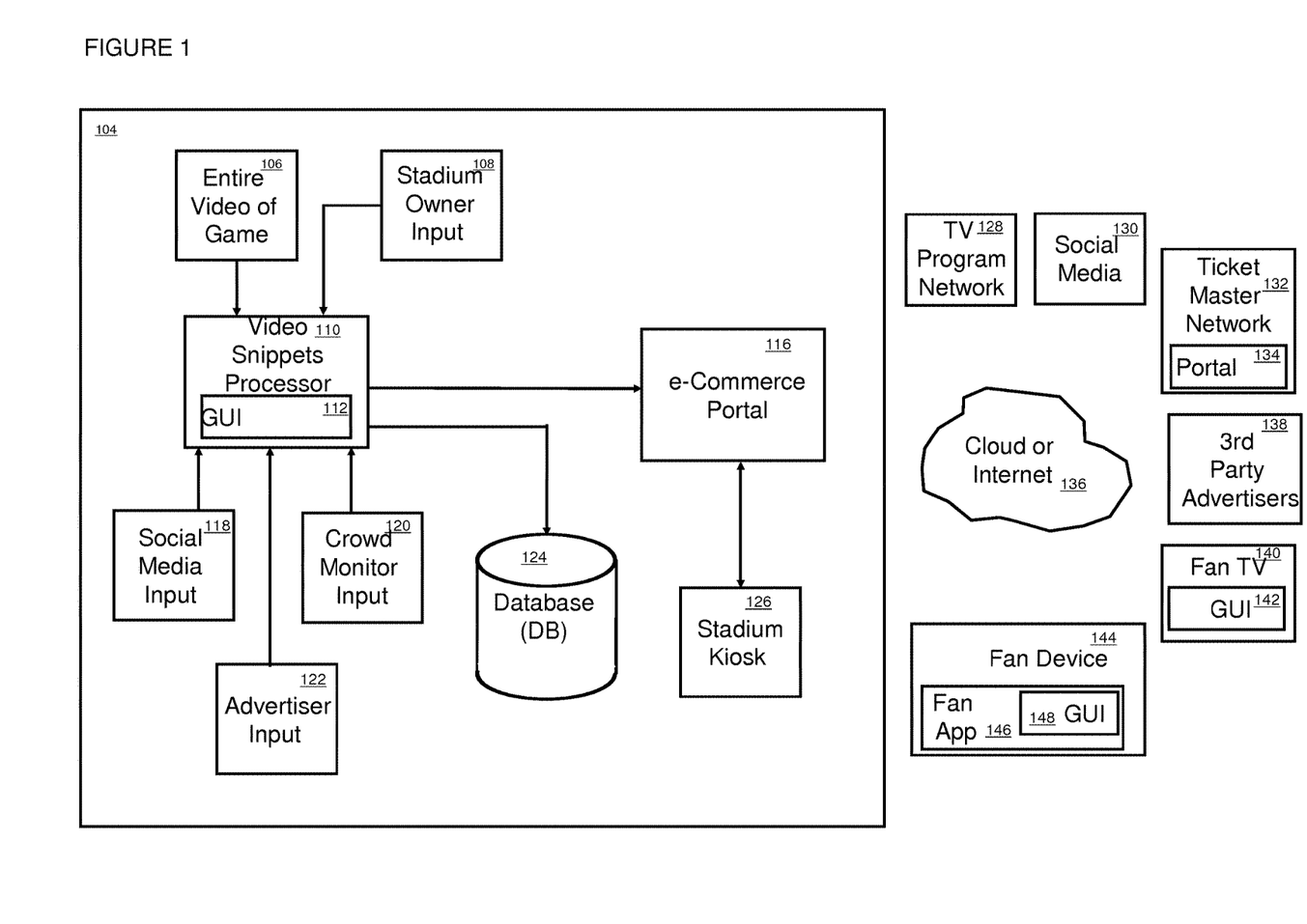
FIG. 1 illustrates an environment in which a system for providing event clips may be implemented.

FIG. 1 illustrates an environment 100 in which a system for providing event clips may be implemented. The environment 100 of FIG. 1 may include a stadium snippet controller 104, a communication network 136 (e.g., the cloud or Internet), one or more social media services 130, a ticket network 132, one or more third-party advertisers 138, and a user device 144. The environment may also include a television program network 128 and a television 140. The ticket network 132 may include a portal 134. The user device 144 may include a fan application 146. The fan application 146 may include a fan application GUI 148. The television 140 may include a television GUI 142. The stadium snippet controller 104 may include a game input 106, a venue input 108, a video snippets processor 110, a social media input 118, a crowd monitor input 120, an advertiser input 122, a database 124, an electronic commerce portal 116, and a venue kiosk 126. The video snippets processor 110 may include a GUI 112.

The video snippets processor 110 may receive input from the game input 106, the venue input 108, the social media input 118, the crowd monitor input 120, and the advertiser input 122. The video snippets processor may output to the database 124 and the electronic commerce portal 116. The electronic commerce portal may be accessed via the venue kiosk 126 or the communication network 136.

The game input 106 may be received from the television program network 128. The social media input 118 may be received from the one or more social media services 130. The advertiser input 122 may be received from the one or more third-party advertisers 138.

The stadium snippet controller 104, the one or more social media services 130, the ticket network 132, the one or more third-party advertisers 138, the user device 144, the television program network 128 and the television 140 may communicate via the communication network 136.

Figure 2:
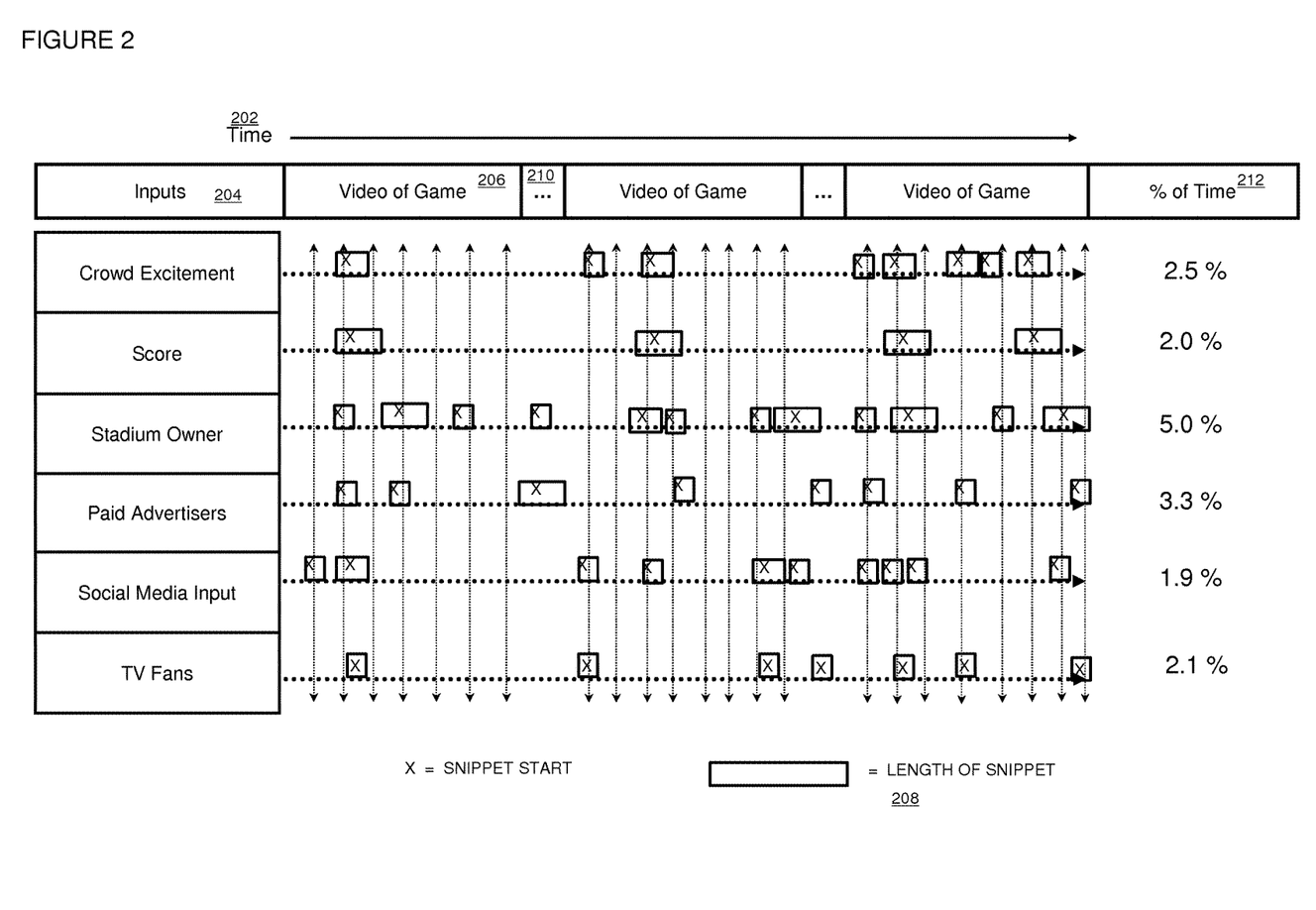
FIG. 2 illustrates a chart of a plurality of event clips generated by a video snippets processor.

FIG. 2 illustrates a chart 200 of a plurality of event clips 208 generated by the video snippets processor 110. The chart 200 of FIG. 2 may include a plurality of event clips 208 charted along an x axis 202, wherein the x axis 202 may represent time; and a percentage column 212. Video input 206 provided for a corresponding event is also charted along the x axis. The video input 206 may be provided in three parts, wherein a break 210 may be charted between each part of the three parts. Each break 210, for example, may occur due to a time-out in a sports event. The plurality of event clips 208 may be categorized according to one or more inputs 204. The one or more inputs may include crowd excitement, score, stadium owner, paid advertisers, and social media input. The one or more inputs may also include TV fans. Crowd excitement input, for example, may generate eight clips, wherein each of the eight clips may vary in length. An occurrence in the event may be included in more than one clip. A touchdown, for example, may be included in a clip generated from crowd excitement input, as well as a clip generated from score input.

Each entry in the percentage column 212 may be calculated by combining all clips in a corresponding input category to determine a total clip duration, dividing the total clip duration with a duration of the event, and multiplying by 100 to yield a corresponding percentage. For example, eight clips generated by crowd excitement input may have a total duration of 2.5 minutes, the event may have a total duration of 100 minutes, and a corresponding entry in the percentage column 212 may be 2.5%.

Figure 3:
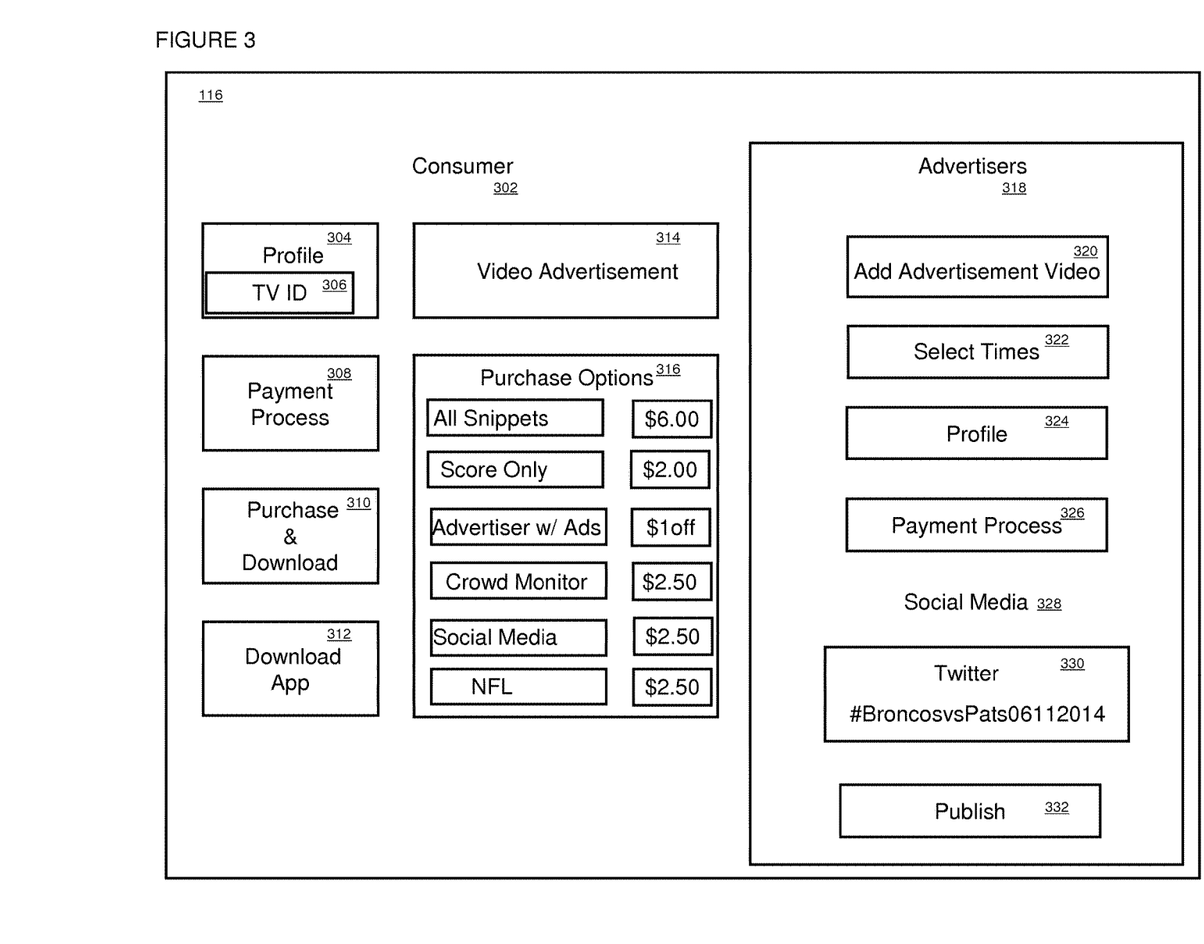
FIG. 3 illustrates an electronic commerce ("e-commerce") portal.

FIG. 3 illustrates an electronic commerce ("e-commerce") portal 300. The e-commerce portal 300 may include a consumer section 302, an advertisers section 318, and a social media section 328. The consumer section 302 may include a profile button 304, a payment process button 308, a purchase and download button 310, a download application ("app") button 312, a video advertisement display 314, and a purchase options subsection 316. The profile button 304 may also include a television (TV) identification (ID) 306. The advertisers section 318 may include an add advertisement video button 320, a select times button 322, a profile button 324, and a payment process button 326. The social media section 328 may include a social media button 330 and a publish button 332. The e-commerce portal 300 may be accessed using the user device 144, the television 140, or the kiosk 126.

An e-commerce portal user may access a profile GUI by selecting the profile button 304. The user may provide, through the profile GUI, information used to process one or more transactions. Provided information may include billing information. The TV ID 306 may be an identification associated with a television displaying the e-commerce portal 300. The TV ID may be an Internet Protocol (IP) address associated with the television.

The e-commerce portal user may provide payment for one or more portal fees using the payment process button 308. The e-commerce portal user may provide payment for the one or more portal fees and download one or more options associated with the one or more portal fees using the purchase and download button 310. The e-commerce portal user may download the fan app146 using the download app button 312. One or more advertisements may be displayed in the video advertisement display 314.

The e-commerce portal user may purchase one or more video clips of an event using the purchase options subsection 316. The purchase options subsection 316 may include one or more options, wherein each option is associated with a fee required to purchase each option. The user may purchase one or more clips using the one or more options. The user may purchase all clips using an all-snippets option. The user, using a score-only option, may purchase all clips wherein at least one point is scored. The user, using an advertiser-with-ads option, may allow one or more purchased clips to include one or more advertisements. The user may receive a discount on one or more purchases when the user uses the advertiser-with-ads option.

The user, using a crowd-monitor option, may purchase all clips generated when an increase in attendee noise is detected at a venue. The user, using a social-media option, may purchase all clips generated when an increase in social media activity associated with the event is detected. The user, using a sports association option, may purchase all clips generated by the sports association. The sports association, for example, may be national football league (NFL).

An advertiser 138 may provide one or more advertisements for inclusion in one or more clips by selecting the add advertisements video button 320 and providing a payment. The advertiser 138, using the select times button 322, may identify one or more triggers at which to generate a clip. The advertiser 138 may also identify one or more insertion points at which to insert one or more advertisements. The advertiser 138, using the profile button 324, may provide preferences and parameters for the one or more advertisements and the one or more clips. The advertiser 138, using the payment process button 326, may specify payment options provided to the user when the user uses the advertiser-with-ads option to purchase one or more clips.

The e-commerce portal user, using the social media button 330, may follow social media activity related to the event. The user, for example, may receive from Twitter all posts which include "#BroncosvsPats06112014." A hash tag may be provided by the event. The e-commerce portal user, using the publish button 332, may send one or more messages for publication through one or more social media services (e.g., Facebook, Twitter).

Figure 4A:
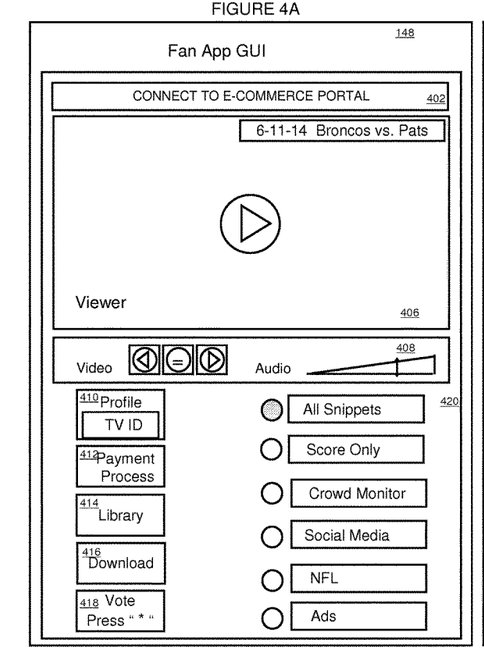
FIG. 4A illustrates a fan application ("app") graphical user interface (GUI).

FIG. 4A illustrates the fan application ("app") graphical user interface (GUI) 148. The fan app GUI 148 may include a portal connection button 402, a viewer 406, a view control section 408, a profile button 410, a payment process button 412, a library button 414, a download button 416, and a purchase options subsection 420. The fan app GUI 148 may also include a vote button 418.

A fan app GUI user may, using the portal connection button 402, connect to the electronic commerce ("e-commerce") portal 300. The user may, using the viewer 406, view one or more purchased clips. The viewer may include a display identifying an event associated with a clip. The viewer may, for example, indicate that a clip is from a game between the "Broncos" and the "Pats" on "Jun. 11, 2014."

The user may, using the view control section 408, control the viewer 406. The user may, for example, adjust audio, pause a clip, and play a clip.

The user may, by selecting the profile button 410, access a profile GUI. The user may provide, through the profile GUI, information used to process one or more transactions. Provided information may include billing information. The profile button 410 may also include a television (TV) identification (ID). The TV ID may be an identification associated with a television displaying the e-commerce portal 300. The TV ID may be an Internet Protocol (IP) address associated with the television.

The user may, by selecting the payment process button 412, provide payment for one or more fees. The user may, by selecting the library button 414, access a library having one or more purchased clips, wherein the user may view the one or more purchased clips through the viewer 406 by selecting the one or more purchased clips from the library. The user may, using the download button 416, download one or more purchased clips to the user device 144. The user may, using the vote button 418, submit a vote to a television program network 128 when the television program network 128 requests viewer feedback during an event.

The user may, using the purchase options subsection 420, purchase one or more video clips of an event. The purchase options subsection 420 may include one or more options, wherein each option is associated with a fee required to purchase each option. The user may purchase one or more clips using the one or more options. The user may purchase all clips using an all-snippets option. The user, using a score-only option, may purchase all clips wherein at least one point is scored.

The user, using a crowd-monitor option, may purchase all clips generated when an increase in attendee noise is detected at a venue. The user, using a social-media option, may purchase all clips generated when an increase in social media activity associated with the event is detected. The user, using a sports association option, may purchase all clips generated by the sports association. The sports association, for example, may be national football league (NFL).

The user, using an ads option, may allow one or more purchased clips to include one or more advertisements. The user may receive a discount on one or more purchases when the user uses the ads option.

Figure 4B:
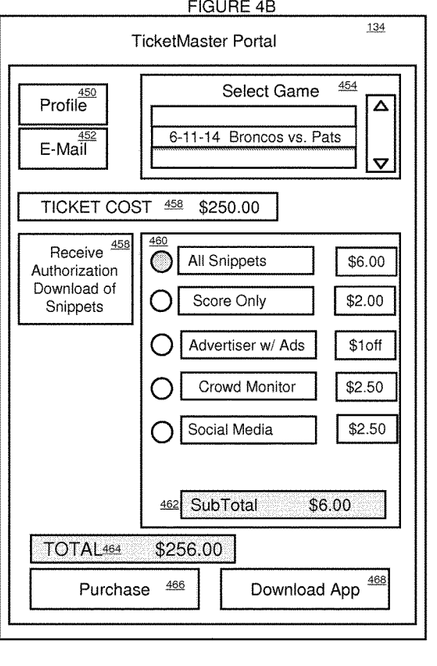
FIG. 4B illustrates a ticket network portal.

FIG. 4B illustrates the ticket network portal 134. The ticket network portal 134, for example, may be a portal for Ticketmaster. The ticket network portal 134 may include a profile button 450, an email button 452, a select game section 454, a ticket cost display 456, an authorization button 458, a snippet options section 460, a total cost display 464, a purchase button 466, and a download application ("app") button 468. The snippet options section 460 may include a subtotal display 462.

A ticket network portal user may, using the profile button 450, create a profile for the ticket network 132. The profile may include information used to process one or more transactions. Provided information may include billing information. Provided information may also include the user's email address. The user may also, using the email button 452, provide the user's email address.

The user may, using the select game section 454, purchase an event ticket for a selected event. The user may, for example, purchase a ticket for a game between the Broncos and the Patriots on Jun. 11, 2014 by selecting "Jun. 11, 2014 Broncos vs. Pats" from the select game section 454. The ticket cost display 456 may display a cost for a ticket selected from the select game section 454.

The user may, using the authorization button 458, automatically receive purchased clips. The user, for example, may automatically receive an email after an event, wherein the email provides access to all purchased clips.

The user may, using the snippet options section 460, select for purchase one or more clips for the selected event. The user may, for example, make a selection to purchase all clips for the event. The subtotal display 462 may display a total cost for one or more selections made in the snippet options section 460.

The total cost display 464 may display a total cost for the ticket selected from the select game section 454 and the one or more selections made in the snippet options section 460. The user may, using the purchase button 466, purchase the selected ticket and the one or more selections made in the snippet options section 460. The user may, using the download application button 468, download the fan app 146.

Figure 5:
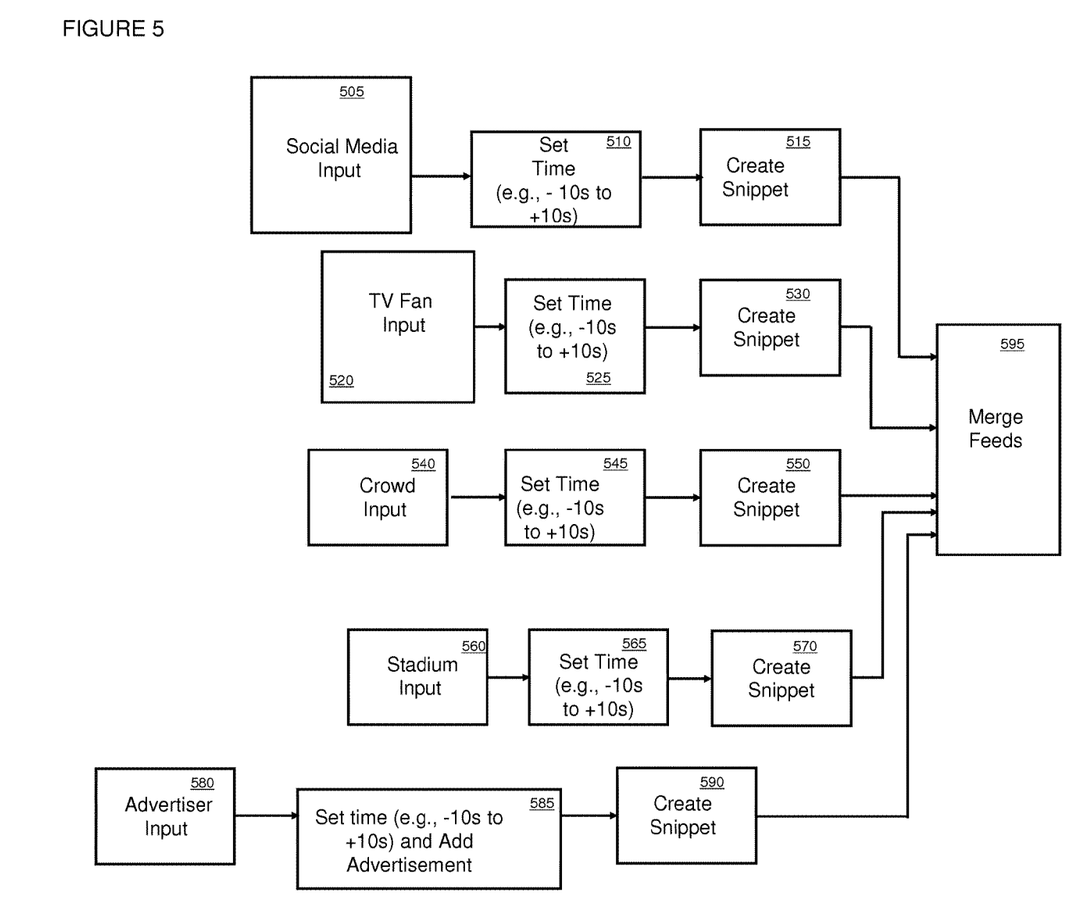
FIG. 5 illustrates a workflow for creating one or more video clips using a video snippets processor.

FIG. 5 illustrates a workflow for creating one or more video clips using the video snippets processor 110. In step 505 of FIG. 5, the video snippets processor 110 may receive a real-time feed from each of one or more social media services. In step 510, the video snippets processor 110 may set a start point and an end point for a clip when social media activity associated with a corresponding event exceeds a predetermined threshold. The predetermined threshold may be provided by a video snippets processor GUI user. Social media activity, for example, may be measured according to a number of hash tags associated with the event. Social media activity, for example, may be measured using "Twitter voting." The start point and the end point may be set according to predefined settings. The video snippets processor GUI user, for example, may desire for a clip to start ten seconds before the predetermined threshold was exceeded by social media activity.

In step 515, the video snippets processor 110 may generate an event clip having a start point and an end point as defined by the GUI user, wherein the clip is associated with the received social media activity. The video snippets processor 110 may generate a unique identifier for the clip.

In step 520, the video snippets processor 110 may receive an input feed of votes captured from the one or more television program networks 128. In step 525, the video snippets processor 110 may set a start point and an end point for a clip when votes associated with a corresponding event exceeds a predetermined threshold. The predetermined threshold may be provided by a television program network 128. Votes, for example, may be submitted using the vote button 418. The start point and the end point may be set according to predefined settings. The television program network 128, for example, may desire for a clip to start ten seconds before the predetermined threshold was exceeded.

In step 530, the video snippets processor 110 may generate an event clip having a start point and an end point as defined by the television program network 128, wherein the clip is associated with the received votes. The video snippets processor 110 may generate a unique identifier for the clip.

In step 540, the video snippets processor 110 may receive a real-time feed of audio captured from attendees at the event. In step 545, the video snippets processor 110 may set a start point and an end point for a clip when volume exceeds a predetermined threshold. The predetermined threshold may be provided by a video snippets processor GUI user. Volume, for example, may increase when attendees cheer after a touchdown. The predetermined threshold, for example, may be 30 decibels (dBs). The start point and the end point may be set according to predefined settings. The video snippets processor GUI user, for example, may desire for a clip to start ten seconds before the predetermined threshold was exceeded.

In step 550, the video snippets processor 110 may generate an event clip having a start point and an end point as defined by the GUI user, wherein the clip is associated with the received audio input. The video snippets processor 110 may generate a unique identifier for the clip.

In step 560, the video snippets processor 110 may receive an input feed of event-related information. The input feed, for example, may indicate when there is a score change in a game. In step 565, the video snippets processor 110 may set a start point and an end point for a clip when a predetermined trigger is received through the input feed, wherein a venue may set the predetermined trigger. A venue may provide one or more predetermined triggers. The one or more predetermined triggers may be provided using the video snippets processor GUI 112. A trigger, for example, may be a score change in a game. The start point and the end point may be set according to predefined settings. The video snippets processor GUI user, for example, may desire for a clip to start ten seconds before the predetermined trigger was satisfied.

In step 570, the video snippets processor 110 may generate an event clip having a start point and an end point as defined by the GUI user, wherein the clip is associated with the received input feed. The video snippets processor 110 may generate a unique identifier for the clip.

In step 580, the video snippets processor 110 may receive an input feed of event-related information. The input feed, for example, may indicate when there is a score change in a game. In step 585, the video snippets processor 110 may, when a predetermined trigger is received through the input feed, set a start point and an end point for a clip and insert a predetermined advertisement into the clip at a predetermined location. An advertiser 138 may set the predetermined trigger, the start point, the end point, and the insertion point, as well as identify the advertisement. The advertiser 138 may provide one or more predetermined triggers. The one or more predetermined triggers may be provided using the video snippets processor GUI 112. A trigger, for example, may be a score change in a game. A clip, for example, may start ten seconds before a trigger and end ten seconds after a trigger, wherein a beverage advertisement may be inserted at the beginning of the clip.

In step 590, the video snippets processor 110 may generate an event clip having an inserted advertisements, a start point, and an end point, as defined by the advertiser 138. The video snippets processor 110 may generate a unique identifier for the clip.

In step 595, the video snippets processor 110 may process one or more generated event clips to identify one or more duplicate clips. A clip may be identified as a duplicate clip of another clip when two clips pertain to a same occurrence. The video snippet processor 110, for example, may generate two clips when there is a score change because the score change satisfied a trigger set by a venue, as well as cause crowd volume to exceed the predetermined threshold. The video snippets processor 110 may merge the one or more duplicate clips, such that each of one or more resulting clips pertain to a unique occurrence.

Figure 6:
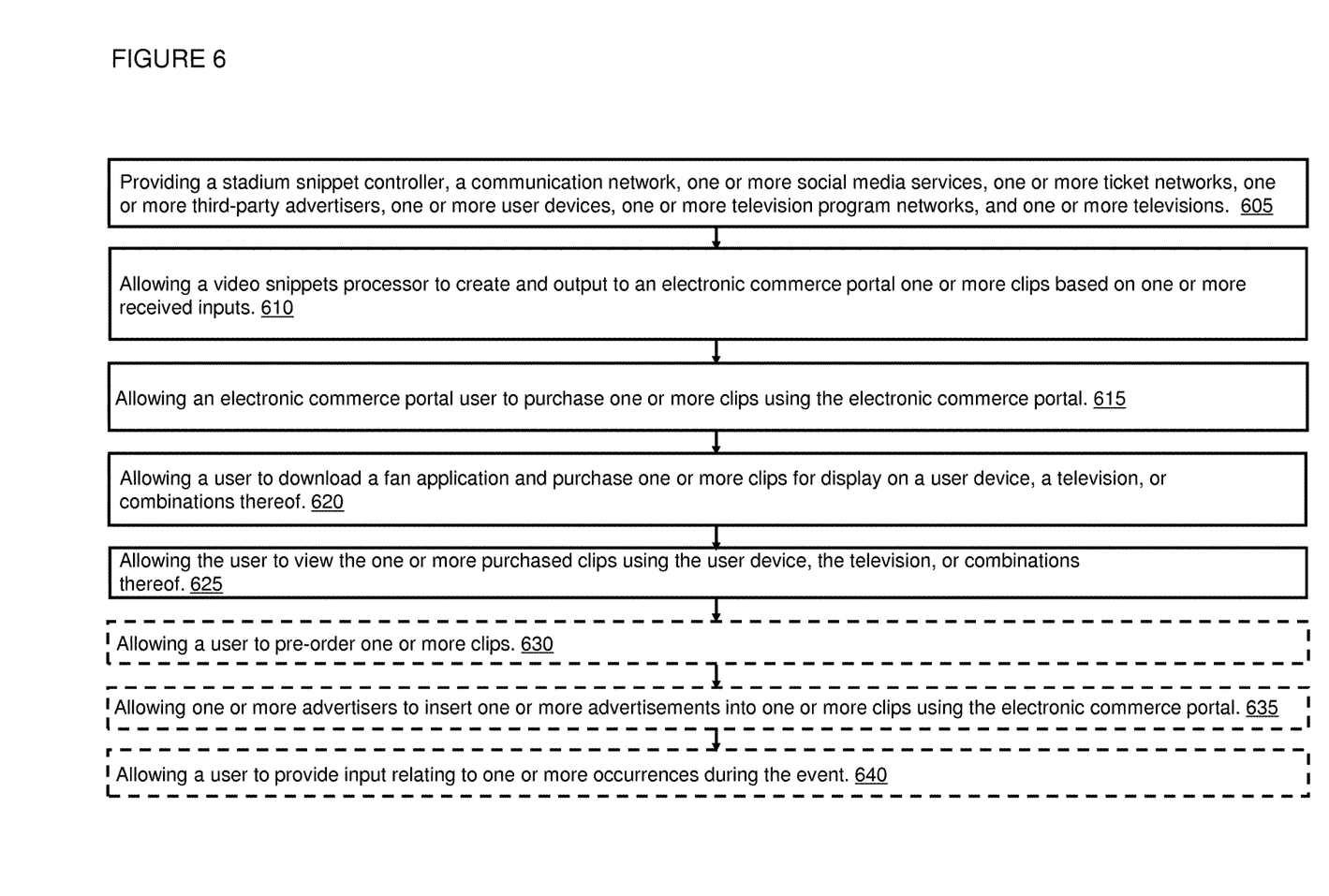
FIG. 6 illustrates a method for providing event clips.

FIG. 6 illustrates a method 600 for providing event clips. The method 600 of FIG. 6 may include, at block 605, providing a stadium snippet controller 104, a communication network 136, one or more social media services 130, one or more ticket networks 132, one or more third-party advertisers 138, and one or more user devices 144. The method 600 may also include providing one or more television program networks 128 and one or more televisions 140. Each of the one or more ticket networks 132 may include a portal 134. Each of the one or more user devices 144 may include a fan application 146. The fan application 146 may include a fan application GUI 148. Each of the one or more televisions 140 may include a television GUI 142. The stadium snippet controller 104 may include a game input 106, a venue input 108, a video snippets processor 110, a social media input 118, a crowd monitor input 120, an advertiser input 122, a database 124, an electronic commerce portal 116, and a venue kiosk 126. The video snippets processor 110 may include a GUI 112.

The method 600 may include, at block 610, allowing the video snippets processor 110 to create and output to the electronic commerce portal 116 one or more clips based on one or more received inputs, wherein the one or more received inputs may include the venue input 108, the social media input 118, the crowd monitor input 120, the advertiser input 122, or combinations thereof.

The method 600 may include, at block 615, allowing an electronic commerce portal user to purchase one or more clips using the electronic commerce portal 116.

The method 600 may include, at block 620, allowing a user to download the fan application 146 and purchase one or more clips for display on a user device 144, a television 140, or combinations thereof.

The method 600 may include, at block 625, allowing the user to view the one or more purchased clips using the user device 144, the television 140, or combinations thereof.

The method 600 may optionally include, at block 630, allowing a user to pre-order one or more clips. The user may pre-order the one or more clips using a ticket network portal 134 or a television program network 128.

The method 600 may optionally include, at block 635, allowing one or more advertisers 138 to insert one or more advertisements into one or more clips using the electronic commerce portal 116.

The method 600 may optionally include, at block 640, allowing a user to provide input relating to one or more occurrences during the event. The user may provide input by submitting a vote using the vote button 418, sending one or more messages for publication through one or more social media services 130 using the publish button 332, or combinations thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing event clips, the method comprising:
   receiving event input captured by a plurality of sensors located at predetermined locations at an event, the event input including at least audio data captured by each sensor of the plurality of sensors and social media information related to the event;
   calculating a sound intensity level from the audio data;
   identifying a total number of social media postings from the social media information;

receiving a plurality of event parameters for creating a plurality of video clips of the event, wherein the plurality of event parameters include at least a sound intensity level threshold and a social media postings threshold;

analyzing a portion of the event input for each of the plurality of event parameters;

creating a video clip of the event having a start point that begins a predetermined period of time from when the sound intensity level satisfies the sound intensity level threshold and when the total number of social media postings satisfies the social media postings threshold;

receiving a request from a user device to acquire the video clip; and providing the user device with access to the video clip in response to the request.

2. The method of claim 1, further comprising determining that the user device is to be provided access to the video clip based on the user device being associated with a ticket for the event.

3. The method of claim 1, further comprising determining an end point for the video clip that ends a second predetermined period of time from when the sound intensity level fails to satisfy the sound intensity level threshold.

4. The method of claim 1, wherein at least one advertisement is inserted into the video clip.

5. The method of claim 1, wherein the video clip may be displayed through an internet-enabled television.

6. The method of claim 1, wherein the video clip is associated with metadata indicating at least one of the plurality of event parameters being satisfied.

7. A system for providing event clips, the system comprising:

a plurality of sensors located at predetermined locations at an event; and a processor that executes instructions stored in memory, the instructions executed to:

receive event input, captured by the plurality of sensors, the event input including at least audio data captured by each sensor of the plurality of sensors and social media information related to the event;

calculate a sound intensity level from the audio data;

identify a total number of social media postings from the social media information;

receive a plurality of event parameters for creating a plurality of video clips of the event, wherein the plurality of event parameters include at least a sound intensity level threshold and a social media postings threshold;

analyze a portion of the event input for each of the plurality of event parameters;

create a video clip of the event having a start point that begins a predetermined period of time from when the sound intensity level satisfies the sound intensity level threshold and when the total number of social media postings satisfies the social media postings threshold;

receive a request from a user device to acquire the video clip; and provide the user device with access to the video clip in response to the request.

8. The system of claim 7, wherein the processor executes further instructions to determine that the user device is to be provided access to the video clip based on the user device being associated with a ticket for the event.

9. The system of claim 7, wherein the processor further executes instructions to determine an end point for the video clip that ends a second predetermined period of time from when the sound intensity level fails to satisfy the sound intensity level threshold.

10. The system of claim 7, wherein at least one advertisement is inserted into the video clip.

11. The system of claim 7, wherein the video clip may be displayed through an internet-enabled television.

12. The system of claim 7, wherein the video clip is associated with metadata indicating at least one of the plurality of event parameters being satisfied.

13. A non-transitory computer-readable storage medium having embodied thereon a program executable by a processor to perform a method for providing event clips, the method comprising:

receiving event input, captured by a plurality of sensors located at predetermined locations at an event, the event input including at least audio data captured by each sensor of the plurality of sensors and social media information related to the event;

calculating a sound intensity level from the audio data;

identifying a total number of social media postings from the social media information;

receiving a plurality of event parameters for creating a plurality of video clips of the event, wherein of the plurality of event parameters include at least a sound intensity level threshold and a social media postings threshold;

analyzing a portion of the event input for each of the plurality of event parameters;

creating a video clip of the event having a start point that begins a predetermined period of time from when the sound intensity level satisfies the sound intensity level threshold and when the total number of social media postings satisfies the social media postings threshold;

receiving a request from a user device to acquire the video clip; and providing the user device with access to the video clip in response to the request.

14. The non-transitory computer-readable storage medium of claim 13, further comprising instructions executable to determine that the user device is to be provided access to the video clip based on the user device being associated with a ticket for the event.

15. The non-transitory computer-readable storage medium of claim 13, further comprising instructions executable to determine an end point that ends a second predetermined period of time from when the sound intensity level fails to satisfy the sound intensity level threshold.

16. The non-transitory computer-readable storage medium of claim 13, wherein at least one advertisement is inserted into the video clip.

17. The non-transitory computer-readable storage medium of claim 13, wherein the video clip is associated with metadata indicating at least one of the plurality of event parameters being satisfied.

* * * * *